United States Patent
Tietto

[11] Patent Number: 5,965,082
[45] Date of Patent: Oct. 12, 1999

[54] METHOD OF PRODUCING A BLOW-MOLDED BODY HAVING MULTIPLE DIMENSIONS AND DEVICE FOR PERFORMING THE METHOD

[75] Inventor: Mario Tietto, Cinisello Balsamo, Italy

[73] Assignee: S.T. Soffiaggo S.R.L., Monza, Italy

[21] Appl. No.: 08/894,761

[22] PCT Filed: Mar. 6, 1996

[86] PCT No.: PCT/EP96/00936

§ 371 Date: Aug. 27, 1997

§ 102(e) Date: Aug. 27, 1997

[87] PCT Pub. No.: WO96/28295

PCT Pub. Date: Sep. 19, 1996

[30] Foreign Application Priority Data

Mar. 13, 1995 [IT] Italy .................................. MI95A0479

[51] Int. Cl.[6] .................................................. B29C 49/04
[52] U.S. Cl. .................... 264/529; 264/540; 425/532; 425/534
[58] Field of Search ................... 264/529, 531, 264/534, 540; 425/532, 534

[56] References Cited

U.S. PATENT DOCUMENTS

| | | | |
|---|---|---|---|
| 3,864,445 | 2/1975 | Dean | 425/534 |
| 4,301,111 | 11/1981 | Olcott | 264/529 |
| 4,634,566 | 1/1987 | Schlenz | 264/515 |
| 4,777,006 | 10/1988 | Wenger et al. | 264/531 |
| 5,264,178 | 11/1993 | Yamamura et al. | 264/531 |
| 5,464,635 | 11/1995 | Geiger | 264/531 |
| 5,589,205 | 12/1996 | Ishikawa et al. | 425/532 |
| 5,662,842 | 9/1997 | Sadr et al. | 264/531 |
| 5,695,711 | 12/1997 | Geiger | 264/540 |
| 5,700,498 | 12/1997 | Renzo et al. | 425/532 |

FOREIGN PATENT DOCUMENTS

| | | | |
|---|---|---|---|
| 53-010659 | 1/1978 | Japan | 264/540 |
| 2-251414 | 10/1990 | Japan | 425/532 |
| 3-193326 | 8/1991 | Japan | 425/532 |
| 3-261534 | 11/1991 | Japan | 264/540 |

*Primary Examiner*—Catherine Timm
*Attorney, Agent, or Firm*—R. Neil Sudol; Henry D. Coleman

[57] ABSTRACT

The present invention relates to a method for producing a blow-molded tubular body having multiple dimensions with the following stages:

a) extrusion of a tubular component that is closed at the front, with injection of gas inside the tubular component (10), and engagement of the tubular component with a shaping unit (12, 13), b) deposition of the shaped tubular component, in the plastic state, on a high-level half-mold part (15), c) free descent of a part of the tubular component onto a low-level half-mold part (18), located at a level that is lower than that of the high-level half-mold part (15), d) closure of the half-mold and blow-molding.

The invention furthermore relates to a device for producing a blow-molded tubular body having multiple dimensions, which includes: a shaping unit (12, 13) to form the shape of the tubular component (10) before deposition on a half-mold (15, 18); a nozzle (21) for the injection of gas inside the tubular component (10) during an extrusion; a conveyor (22) device to convey the tubular component (10) during the extrusion and allow an engagement of the shaping unit (12, 13).

20 Claims, 7 Drawing Sheets

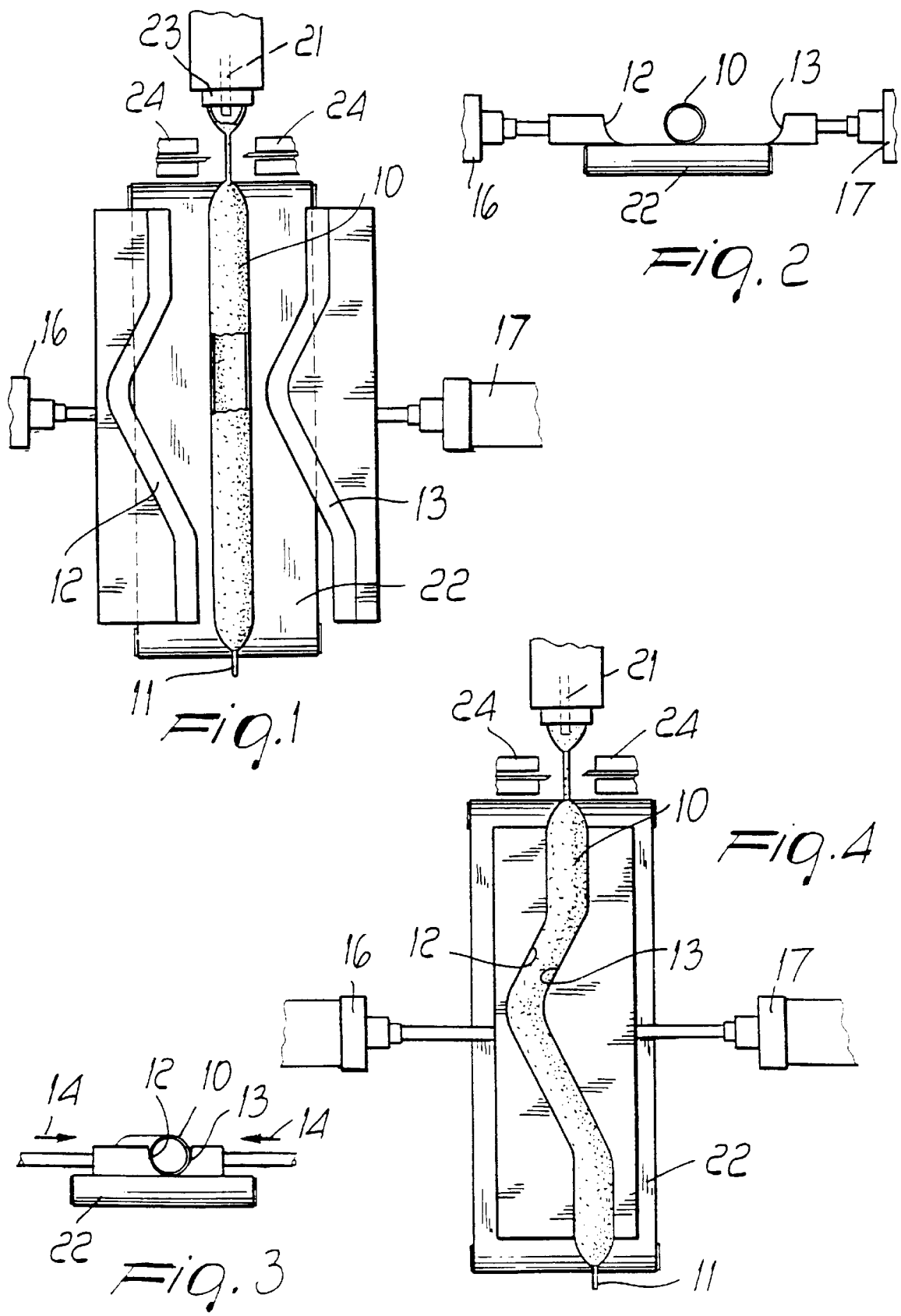

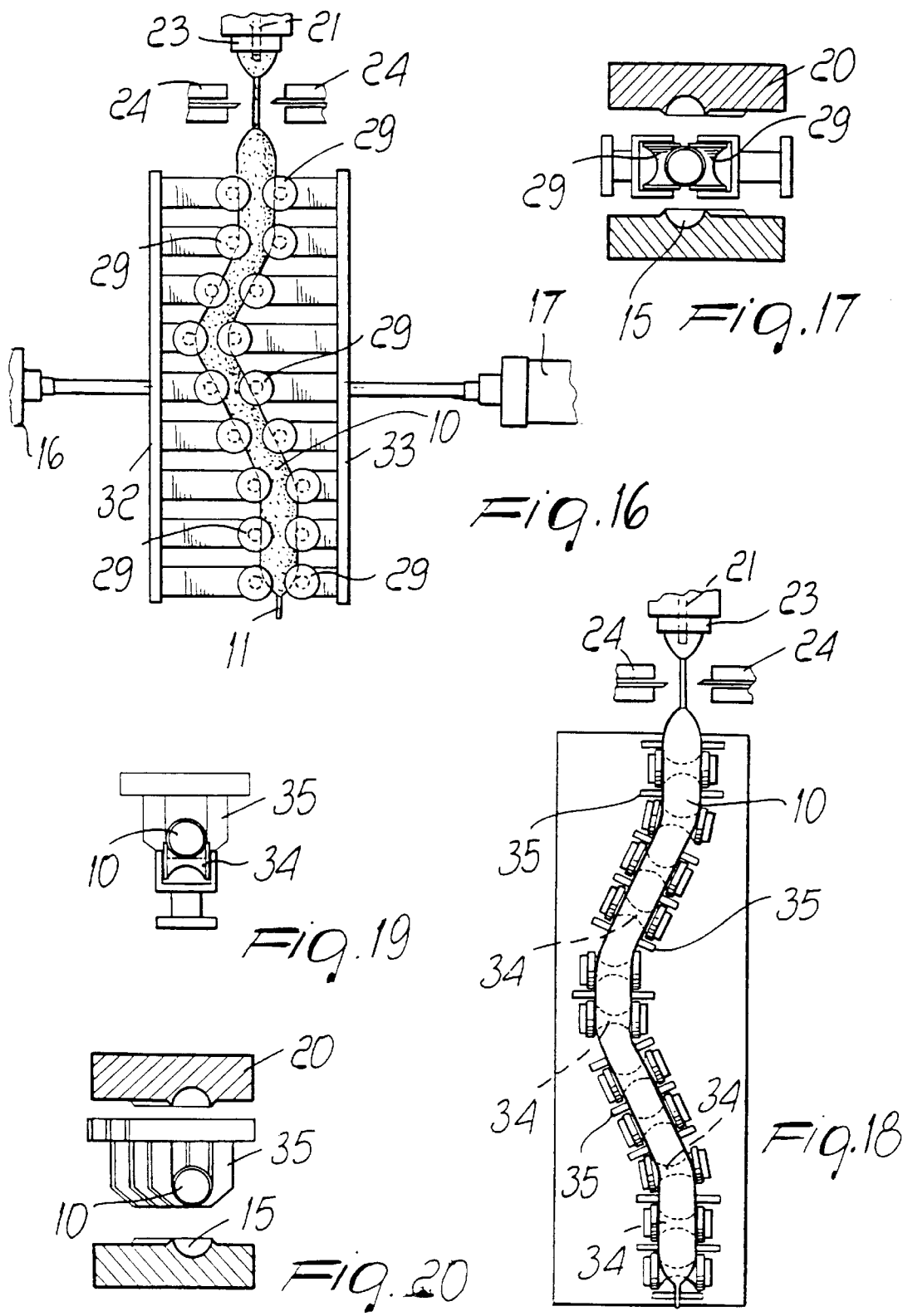

METHOD OF PRODUCING A BLOW-MOLDED BODY HAVING MULTIPLE DIMENSIONS AND DEVICE FOR PERFORMING THE METHOD

The present invention relates to a method for producing a blow-molded body having multiple dimensions and to a device for performing the method.

It is known that it is possible to blow-mold asymmetrical parts having a complicated shape, which have, for example, an axis that is first orientated in one dimension, then in a second one and finally in a third one, thus involving multiple dimensions, such as forced ventilation ducts of cars.

The simplest way to mold these parts is to extrude a very large tubular component whose diameter is sufficient to cover the entire profile of the part that must be molded. In this case, obviously the molded part can have a diameter that is much smaller than the diameter of the tubular component from which it is obtained; accordingly, waste is very high, up to 300–1000%. This entails serious problems, since the waste material must not only be ground again, mixed, and cleaned, with obvious burdens, but during all of these treatments its quality degrades considerably, so much that only virgin material is required for many productions, excluding recycled waste material. Furthermore, in this manner heat-sealing seams necessarily form along two opposite edges of the finished blow-molded body which can be more or less satisfactory, depending on various molding parameters that are difficult to control and particularly depending on the shape of the mold, but in any case constitute a severe weakness factor for the finished body. Finally, a machine that is several times bigger than the one required to mold a straight part of the same diameter is obviously necessary. In this manner, costs for the machine, the material, consumption, electricity, et cetera rise sharply.

Battenfeld Fisher and Krupp Kautex have developed a system in which the extruded tubular component is placed inside a mold that can be disassembled by virtue of a series of robotized mechanical devices that are arranged so as to deform the tubular component, which is still in the plastic state, to adapt it to the shape of the mold. In this manner, the problem of waste is solved at the outset, but a very expensive mold must be used. In particular, the modular mold is extremely expensive because it is composed of various parts that must close gradually as the tubular component is bent by the mechanical devices into the desired shape.

Placo Co. has developed a system in which the mold assembly is movable, so that it can follow a preset path that corresponds to the final shape of the part to be produced. Obviously, in this case, too, the movement of the mold assembly is extremely complicated and very expensive. Moreover, in view of the enormous moving masses, inertia problems arise that force to slow down the process. Slowness does not obviously just limit productivity but also produces intrinsic problems for this type of production. If the times are too long, the extruded tubular component deposited on half of the mold tends to cool before blow-molding, and furthermore does so unevenly. This obviously produces problems, especially for thin parts, which are subject to quick cooling. One should in fact consider that the mold is cooled and is made of metallic material; accordingly, it is an excellent heat conductor. In this manner, during blow-molding, the colder parts of the tubular component certainly cannot have the same expandability as the hotter parts, and therefore the colder parts will maintain a relatively excessive thickness, whereas the hot parts will be subjected to considerable drawing and to a corresponding reduction in thickness that weakens the finished body. Furthermore, it is rather difficult to obtain small radii of curvature. Finally, there are difficult problems in adjusting the machine, on a case-by-case basis, in order to synchronize the speed of the movement of the mold assembly with the descent speed of the tubular component.

IHI and Sumitomo have developed a machine in which the tubular component is drawn by suction into the mold, which is already closed. This system can work only in certain favorable conditions. Moreover, it is necessary to take precautions to prevent the tubular component from adhering to the walls of the mold during insertion.

German patent application DE 4 305 735.7 describes a system in which, simultaneously with the extrusion, a moving frame takes up the tubular component in the desired shape; then the frame is transferred to the closure region and is opened, depositing the tubular component on a half-mold. However, to achieve this process it is necessary to synchronize the movement of the frame with the tube descent speed. This requires the intervention of specialized personnel every time a different part must be molded. All this entails problems that are not easy to solve. Moreover, the tubular component must follow a blending curve, because the extrusion head is vertical. This curve must be taken into account during programming. Furthermore, it is rather difficult to obtain small radii of curvature.

The aim of the present invention is therefore to overcome the above drawbacks by providing a method and a device that allow to mold parts having multiple axes with an apparatus that is simple and inexpensive.

An object is to avoid the use of sophisticated electronic controls.

Another object is to be able to mold parts of any length without problems.

Another object is to move only parts that have limited weights and dimensions, so as to ensure high speed in addition to limited cost.

Another object is to allow a low conversion cost whenever the mold must be changed.

Another object is to obtain small radii of curvature even with highly rigid tubes.

Another object is to be able to use all existing conventional blow-molding molds without any need for particular adaptations.

This aim, these objects, and others are achieved by the method according to the invention, which includes the following stages:

a) extrusion of a tubular component that is closed at the front, with injection of gas inside the tubular component, and engagement of the tubular component with a shaping unit, b) deposition of the shaped tubular component, in the plastic state, on a high-level half-mold part, c) free descent of a part of the tubular component onto a low-level half-mold part, located at a level that is lower than that of the high-level half-mold part, d) closure of the half-mold and blow-molding.

The invention furthermore relates to a device for producing a blow-molded tubular body having multiple dimensions that includes: a shaping unit to shape the tubular component before deposition on a half-mold; a nozzle for injecting gas inside the tubular component during an extrusion; a conveyor device for conveying the tubular component during the extrusion and allow an engagement of the shaping unit.

The invention will become apparent with reference to the accompanying drawings, provided by way of non-limitative example, of multiple embodiments of the method and of the device according to the invention, wherein:

FIG. 1 is a plan view of a first embodiment of the invention;

FIG. 2 is a schematic front view of the device of FIG. 1;

FIG. 3 is a front view of the device of FIG. 1 during another stage of the method;

FIG. 4 is a plan view of the device of FIG. 3;

FIG. 16 is a plan view of a fifth embodiment of the device according to the invention;

FIG. 17 is a partially sectional front view of a detail of the device of FIG. 16;

FIG. 18 is a plan view of a sixth embodiment of the device according to the invention;

FIG. 19 is a front view of a detail of the device of FIG. 18;

FIG. 20 is a partially sectional front view of a detail of the device of FIG. 19, in a subsequent stage of the method;

Figure 5:
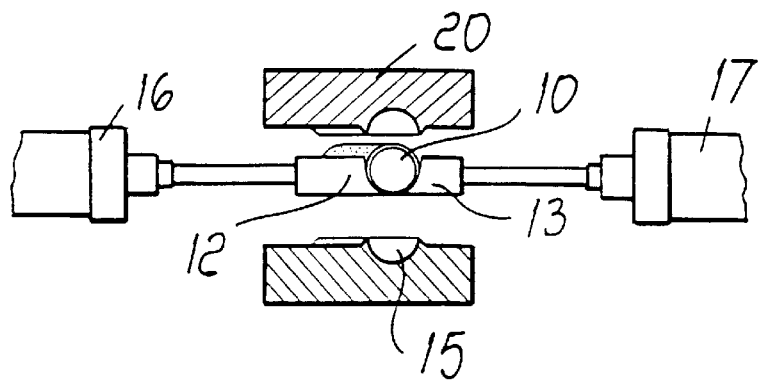
FIG. 5 is a partially sectional front view of the device of FIG. 3 in a subsequent stage of the method.
Figure 6:
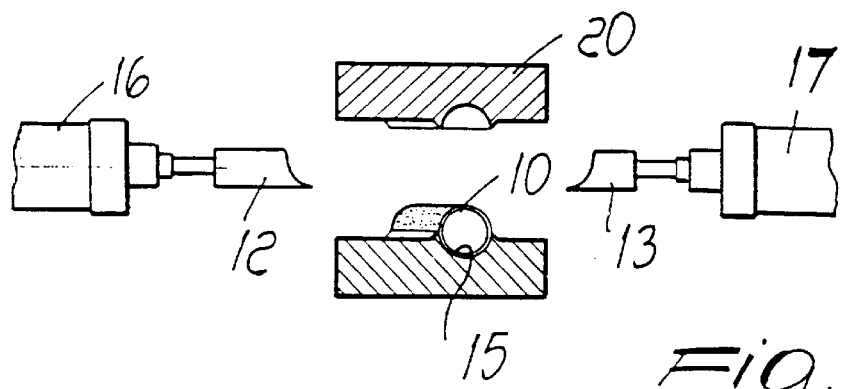
FIG. 6 is a partially sectional front view of the device of FIG. 5, in a subsequent stage of the method.

With reference to FIGS. 1 to 8, a first embodiment of the method and of the device according to the invention is shown. In particular, in stage (a), the tubular component 10 is closed at the front, at the end 11, so as to prevent the escape of the gas, generally air, that is injected inside the tubular component to keep its walls mutually apart. The tubular component is in fact still in the plastic state and any contact between the walls would lead to immediate mutual adhesion.

At the end of the extrusion, the tubular component 10 is cut and sealed by the sealing and cutting pincers 24. The tubular component 10 is engaged by a shaping unit 12 and 13, which engages the tubular component by moving in the direction indicated by the arrows 14. In particular, the two parts 12 and 13 of the shaping unit can each be moved by at least one actuator cylinder 16 and 17.

According to stage (b), the tubular component 10, supported by the shaping unit 12 and 13 (which can also be heated) is still at high temperature and in the plastic state, and is deposited on a high-level half-mold part 15. The half-mold can be composed of various parts, which are identified according to their distance (elevation) from the ground for the purposes of the present invention. The high-level half-mold part 15, in particular, is at a higher level than a low-level half-mold part 18 located at a lower level. Stage (b) is described with particular reference to FIGS. 5, 6, and 7.

According to stage (c), the tubular component 10, still in the plastic state, now free from engagement with the shaping unit 12 and 13, rested on the raised half-mold part 15, has a protruding part 19, shown in dashed lines, that descends freely by gravity onto the lower half-mold part 18, in the direction of the arrow 9, until it reaches the position shown in dot-and-dash lines. Stage (c) is described with particular reference to FIG. 7.

Figure 8:
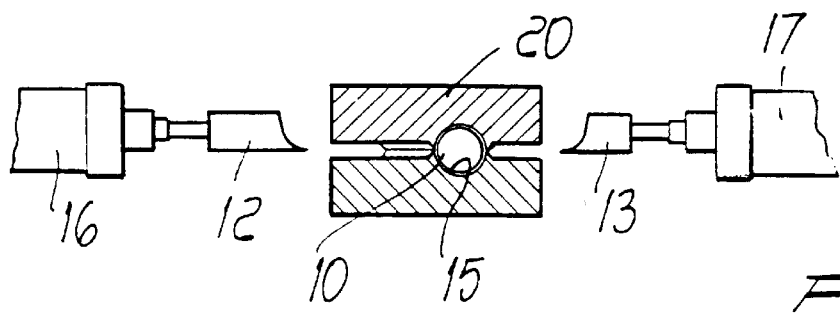
FIG. 8 is a partially sectional front view of the device of FIG. 7 in a subsequent stage of the method.
Figure 7:
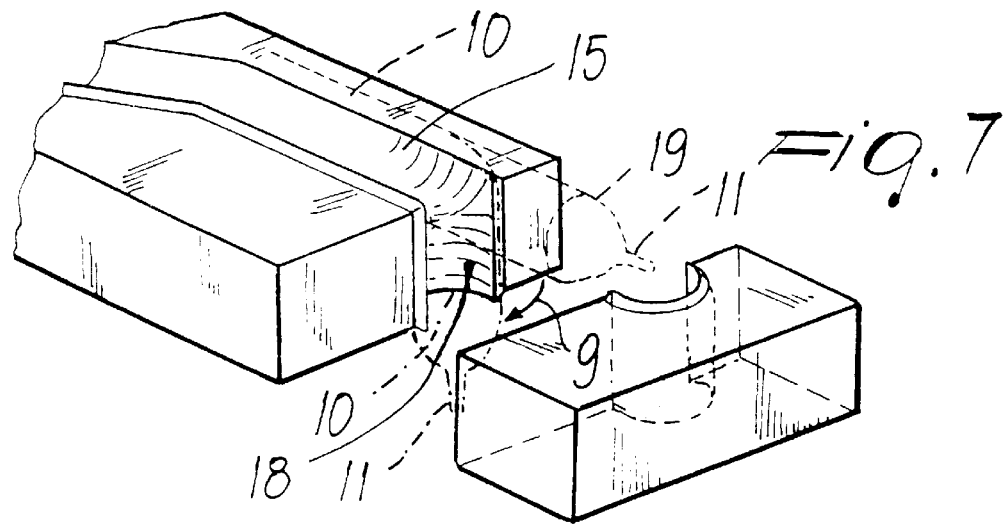
FIG. 7 is a perspective view of the device of FIG. 6 in a subsequent stage of the method.

According to stage (d), with particular reference to FIG. 8, the upper part of the mold 20 is closed and the tubular component is blow-molded, by inserting a needle, until the cavity of the mold is completely filled.

The shaping unit 12 and 13 acts mainly in two dimensions, on a substantially horizontal plane. The free descent of a part 19 of the tubular component 10 occurs in a third, substantially vertical dimension.

The device according to the invention includes: a shaping unit 12 and 13 to shape the tubular component prior to deposition on a half-mold; a nozzle 21 for introducing gas inside the tubular component 10 during an extrusion; and a conveyor device 22 for conveying the tubular component 10 during extrusion and allowing engagement of the shaping unit 12 and 13. The shaping unit 12, 13 is actuated by parts that can move in substantially horizontal direction 12 and 13. The shaping unit 12 and 13 is formed by two complementary bodies 12 and 13 that engage the opposite sides of the tubular component 10.

The conveyor device 22 acts substantially in a horizontal direction, and according to the embodiment shown in FIGS. 1 to 4, it is formed by a conveyor belt that preferably works on a horizontal plane.

The half-mold 15, 18 is preferably arranged below the extrusion region, so that there is no need to move the tubular component 10 horizontally.

Preferably, the extrusion head 23 is arranged horizontally, so as to be able to perform a horizontal extrusion, so that the tubular component 10 is immediately in the position that is suitable for depositing it on the half-mold.

The above described embodiment is preferred because it is particularly simple and reliable both in terms of equipment and in terms of method execution.

Preferably, with particular reference to FIGS. 26–29, the shaping unit 12, 13 includes two parts 40, 41, 42, 43 that allow a relative movement of one with respect to the other. In particular, a lateral part 40, 42 laterally supports the tubular component 10 and is in turn supported by an actuator device 16, 17. A lower part 41, 43 supports, in a downward region, the tubular component 10. The lower part 41, 43 can be moved with respect to the lateral part 40, 42 by virtue of the auxiliary actuator device 40, 42, which is formed for example by a pair of pneumatic cylinders 44, 45. This embodiment is preferred because it reduces the possibility of adhesion between the tubular component and the shaping unit 12, 13, thus offering the best operating reliability. FIGS.

26–29 furthermore illustrate, in succession, the development of the relative motion of the lateral part and of the lower part, so as to allow an adequate positioning of the tubular component in the lower half-mold 15, 18.

Figure 9:
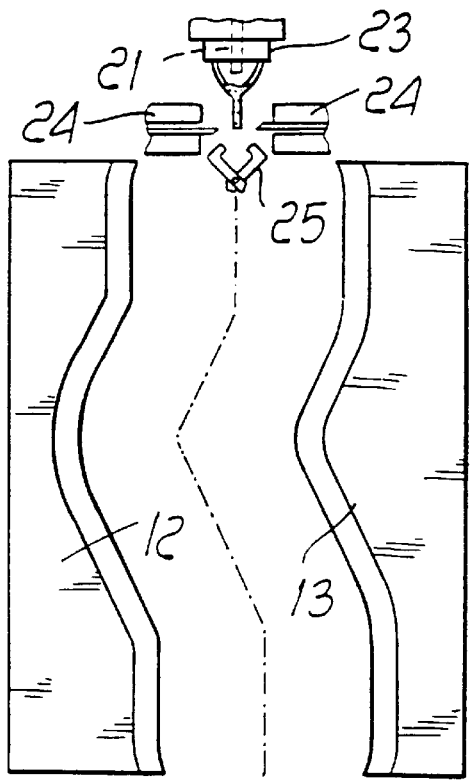
FIG. 9 is a plan view of a second embodiment of the device according to the invention.
Figure 10:
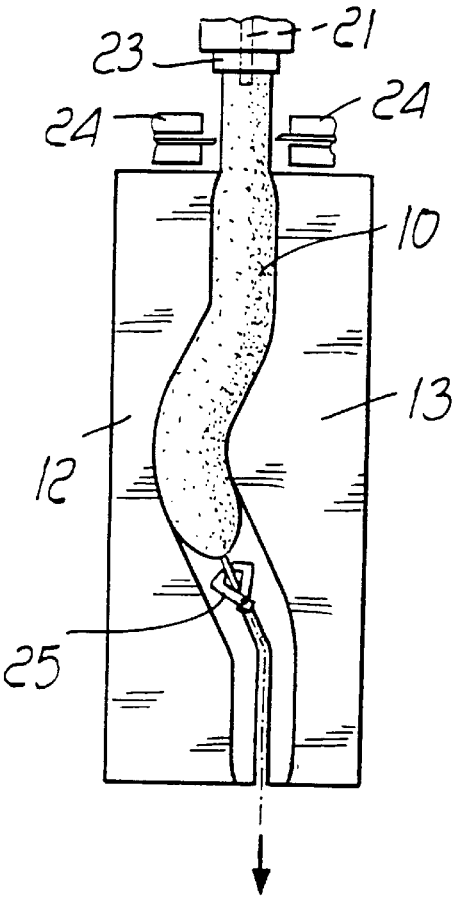
FIG. 10 is a plan view of the device of FIG. 9 in a subsequent stage of the method.
Figure 11:
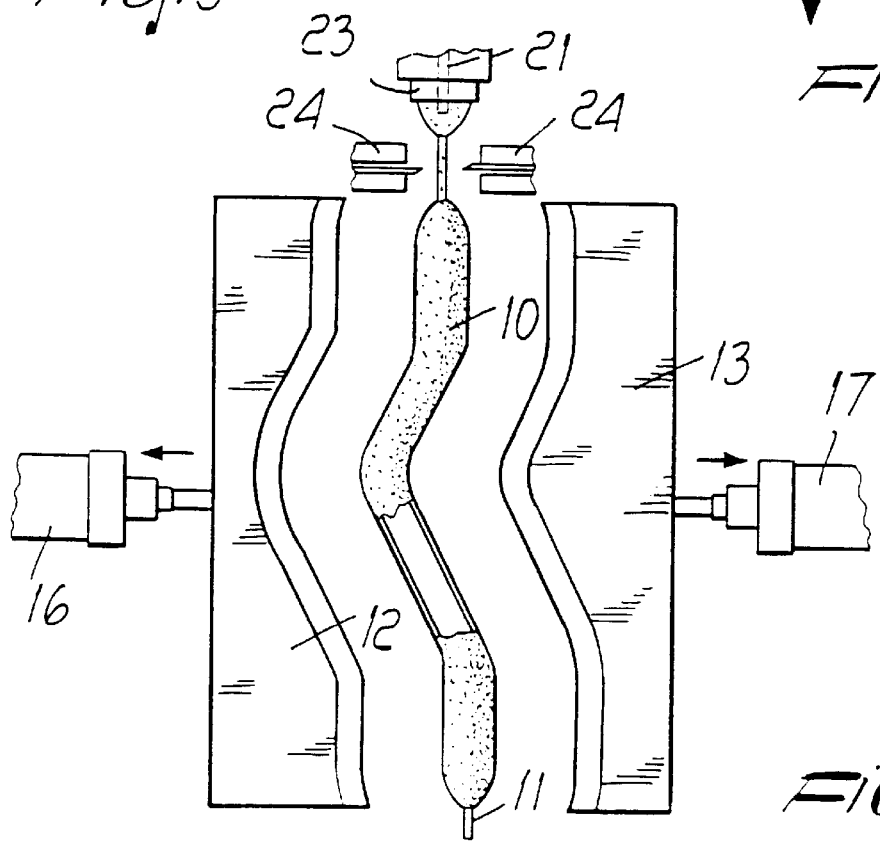
FIG. 11 is a plan view of the device of FIG. 10 in a subsequent stage of the method.
Figure 15:
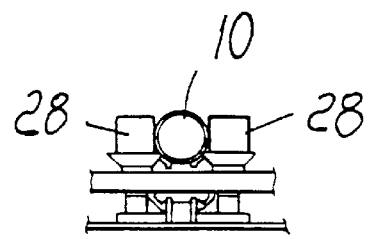
FIG. 15 is a front view of a detail of the device of FIG. 14.
Figure 14:
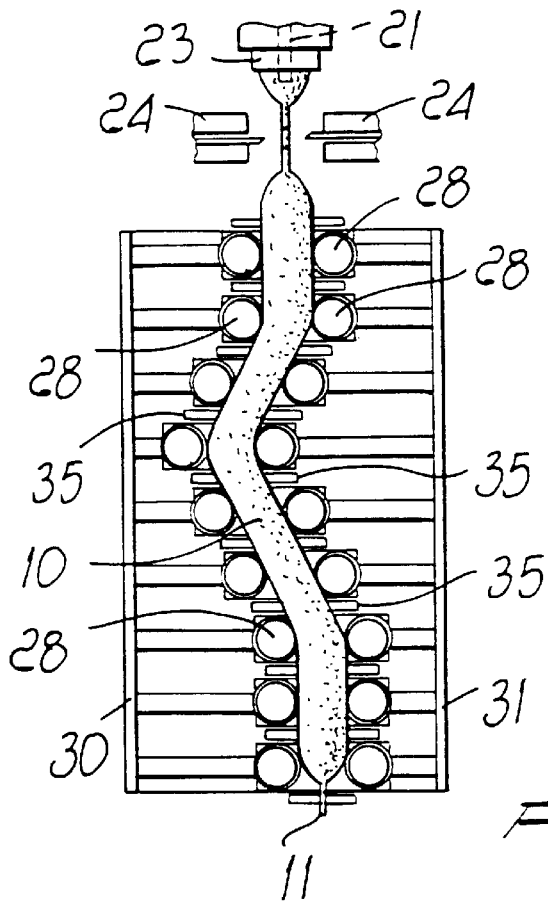
FIG. 14 is a plan view of a fourth embodiment of the device according to the invention.

According to another embodiment, with particular reference to FIGS. 9 to 11, the conveyor device 25 is formed by a pulling clamp that is arranged outside the tubular component 10. In this case, the shaping unit 12, 13 can even be closed before the engagement of the conveyor device 25, as shown in the figures. However, in order to reduce friction, and particularly for complicated shapes, it is preferable to first activate the conveyor device 25 and then the shaping unit 12, 13.

More generally, according to the invention, it is preferable to first extrude the tubular component completely, without shaping it during extrusion, and then, once extrusion has ended, shape it and finally transfer it into the mold.

As an alternative, with an embodiment that is not shown in the figures but is understandable for a technician in the field, the conveyor device is formed by a pusher rod that is arranged inside the tubular component. In particular, the pusher rod is arranged inside the extrusion head 23 and can push the tubular component forward as it is being extruded. According to this last embodiment, the tubular component can be extruded only when straight and the shaping unit 12 and 13 can engage the tubular component only at the end of the extrusion.

Figure 12:
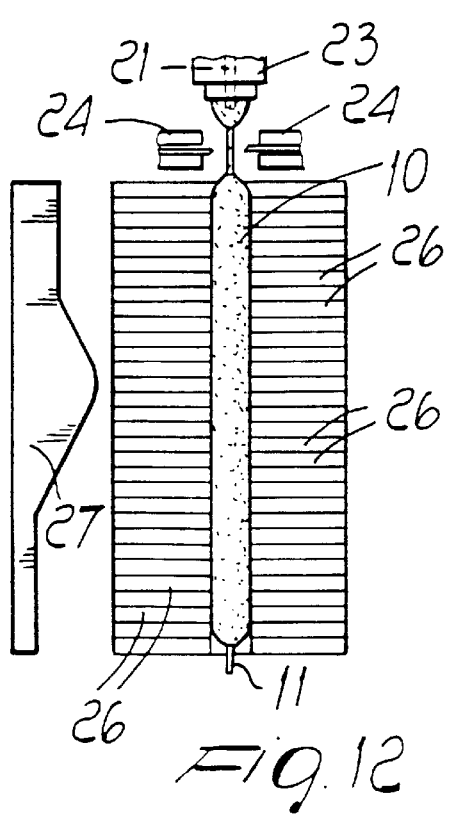
FIG. 12 is a plan view of a third embodiment of the device according to the invention.
Figure 13:
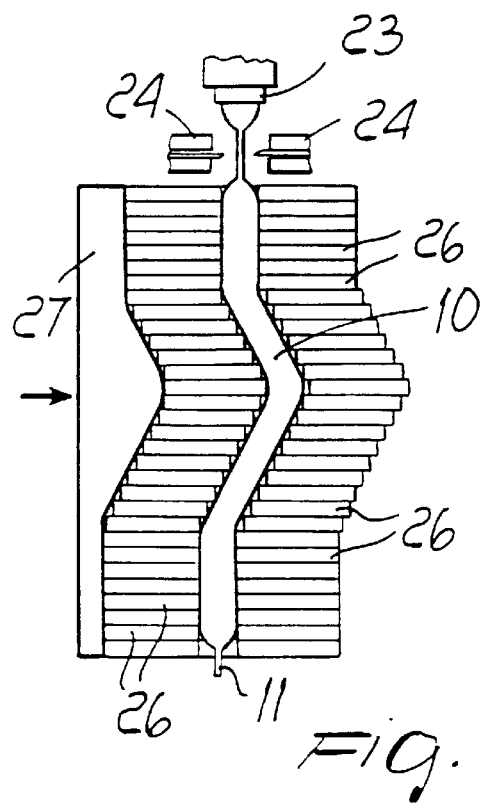
FIG. 13 is a plan view of the device of FIG. 12 in a subsequent stage of the method.
Figure 21:
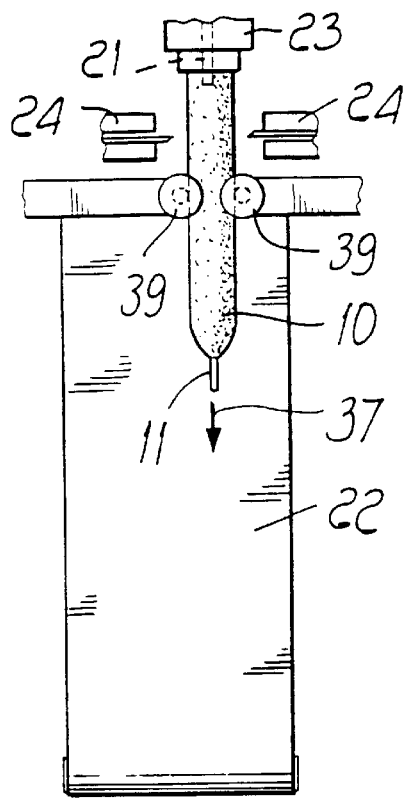
FIG. 21 is a plan view of a seventh embodiment of the device according to the invention.
Figure 22:
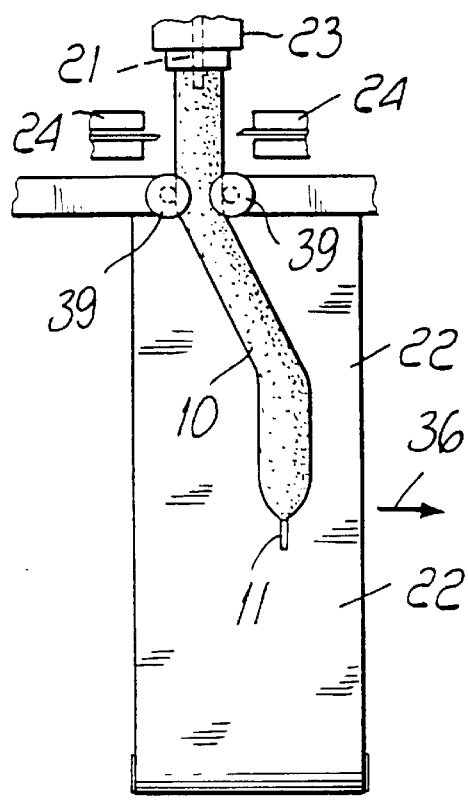
FIG. 22 is a plan view of the device of FIG. 21 in a subsequent stage of the method.
Figure 24:
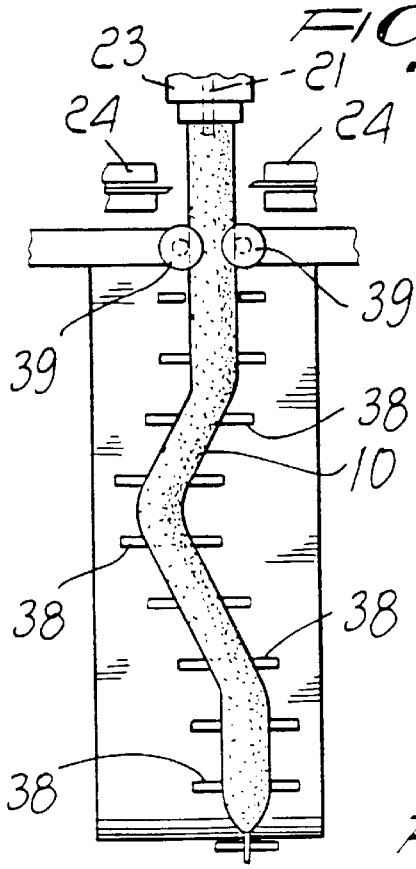
FIG. 24 is a plan view of the device of FIG. 22 in a subsequent stage of the method.
Figure 23:
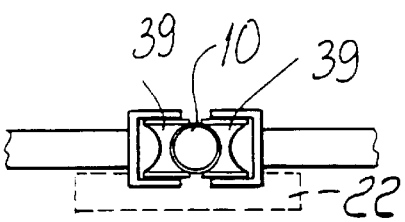
FIG. 23 is a front view of a detail of the device of FIG. 21.
Figure 25:
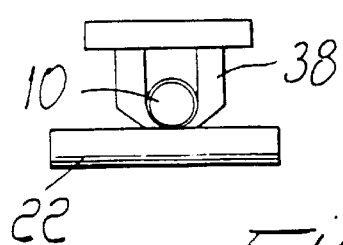
FIG. 25 is a front view of a detail of the device of FIG. 24.
Figure 28:
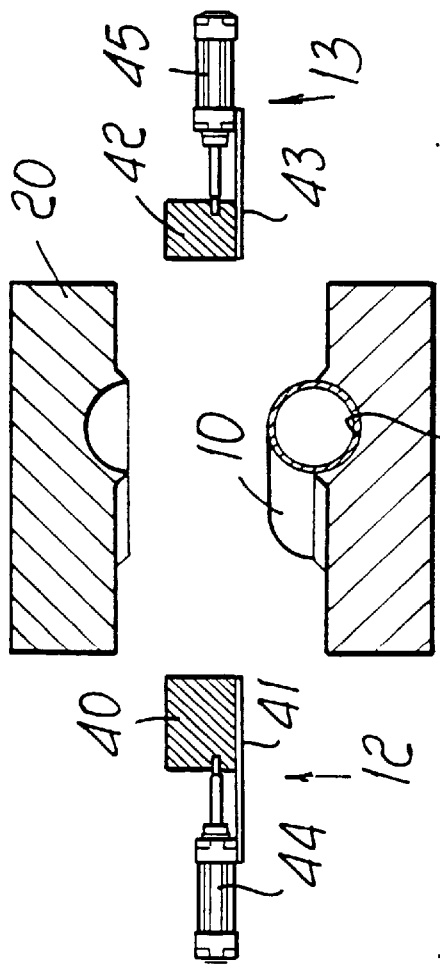
FIG. 28 is another embodiment of the device of FIG. 6.
Figure 29:
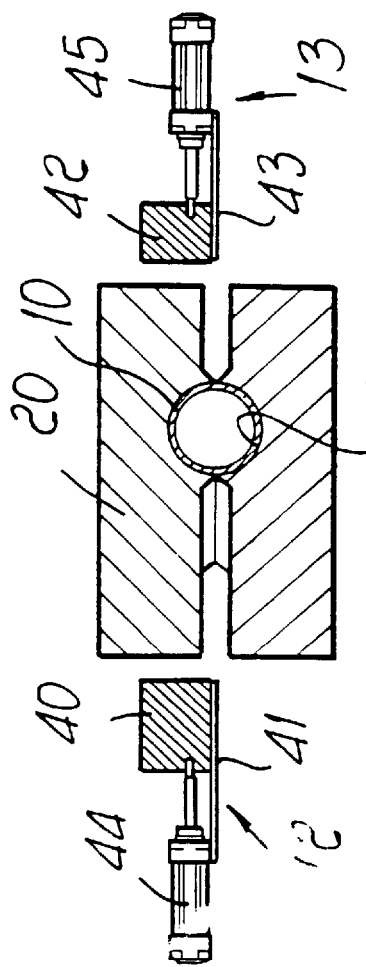
FIG. 29 is another embodiment of the device of FIG. 8.
Figure 26:
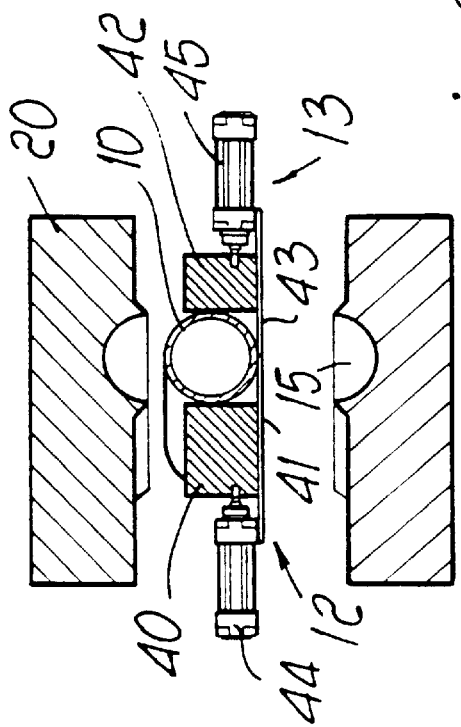
FIG. 26 is another embodiment of the device of FIG. 5.
Figure 27:
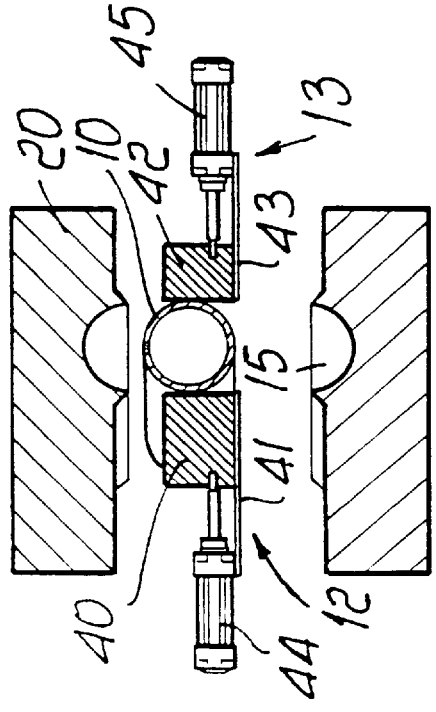
FIG. 27 is another embodiment of the device of FIGS. 5, 6.

According to another embodiment, described with particular reference to FIGS. 12 and 13, the shaping unit is formed by multiple movable parallel bodies 26, whose profile can be altered by engagement with a template 27. This embodiment has the advantage of allowing prompt and low-cost variation of the profile, simply by changing the template 27.

According to another embodiment, illustrated with particular reference to FIGS. 14–17, the shaping unit is formed by multiple motorized rollers 28 and 29 that have vertical axes. In this case, too, the shaping unit is formed by two complementary parts 30 and 31, 32 and 33, that are separated when the shaped tubular component is exactly above the mold, thus depositing it on the half-mold part 15, as shown in particular by FIG. 17.

According to another embodiment, described with particular reference to FIGS. 18–20, the shaping unit is formed by multiple motorized rollers 34 that have a horizontal axis. In this case, the tubular component 10 shaped above the rollers 34 is picked up by multiple clamps 35 that can carry it and deposit it on the half-mold part 15.

According to another embodiment, described with particular reference to FIGS. 21–25, the shaping unit is formed by a device for moving the belt 22 in a direction 36 that is substantially perpendicular to a direction 37 for the extrusion and/or advancement of the tubular component. The device for movement in the direction 36 is not shown in the figures but can be provided for example by mounting the belt on a pair of racks that are arranged in the direction 36 and by moving the racks with a hydraulic motor by an extent that corresponds to the bend required for the tubular component 10. In this manner, movement and extrusion can occur simultaneously and it is thus possible to form the required profile of the tubular component 10. The rollers 39 keep the tubular component 10 positioned precisely, so that it can follow the movements of the belt. Once it has been shaped, the tubular component 10 can be picked up with the clamps 38 and deposited on the half-mold part 15, as already described with reference to FIG. 20.

The invention lends itself, as shown, to several variations, all of which are within the scope of the same inventive concept. Accordingly, it is possible to mutually combine parts of these variations or replace them with another equivalent means for the purposes of the invention. Thus, for example, the actuator device 16, 17 can be formed by ballscrews, by toggle systems, or by toothed belts, instead of by the piston-and-cylinder units shown in the figures. In particular, it has been observed that toothed belts are particularly preferred due to their higher speed, lack of noise, and controllability.

I claim:

1. Method for producing a blow-molded tubular body having multiple dimensions, which comprises the following stages:
    a) completely extruding a tubular component that is closed on a front side onto a conveyor device, with injection of gas inside said tubular component,
    b) subsequently, after said extrusion onto said conveyor device has been completed, engaging said tubular component with a shaping unit formed by two complementary movable bodies that approach and engage opposite longitudinal sides of said tubular component to substantially alter the shape of said tubular component along a substantial portion of the length thereof,
    c) depositing said shaped tubular component, in a plastic state, on a half-mold, and
    d) closing said half-mold with a complementary half-mold and blow-molding.

2. Method according to claim 1, wherein said shaping unit acts in two dimensions, in a substantially horizontal plane, said method further comprising allowing part of said tubular component to freely descend in a third, substantially vertical dimension.

3. Method according to claim 1, wherein, during extruding of said tubular component onto said conveyor device, said conveyor device conveys said tubular component in a horizontal direction.

4. Method according to claim 3 wherein said conveyor device is formed by a conveyor belt that acts in a horizontal plane.

5. Method according to claim 3 wherein said conveyor device is formed by a pulling clamp that is arranged outside said tubular component.

6. Method according to claim 3 wherein said conveyor device is formed by a pusher rod that is arranged inside said tubular component.

7. Method according to claim 1 wherein an extrusion head is arranged horizontally, so as to perform a horizontal extrusion.

8. Method according to claim 1 wherein said half-mold is arranged substantially below an extrusion region.

9. Device for preparing a preform for use in a blow molding process, comprising:
    a shaping unit for substantially altering the shape of a tubular component before deposition of said tubular component on a half-blow-mold;
    a nozzle for the injection of gas inside said tubular component during an extrusion;
    a conveyor device for conveying said tubular component during said extrusion and allowing an engagement of said shaping unit with said tubular component;
    said shaping unit comprising two parts, arranged on opposite longitudinal sides of said tubular component and extending, longitudinally along a substantial portion of said tubular component, relatively movable with respect to one another for substantially altering the shape of said tubular component;

said conveyor device being distinct and provided with independent movement with respect to said shaping unit.

10. Device according to claim 9 wherein said shaping unit is actuated by devices that can move in a substantially horizontal direction.

11. Device according to claim 9 wherein said conveyor device acts substantially in a horizontal direction.

12. Device according to claim 9 wherein said conveyor device is formed by a conveyor belt that operates in a horizontal plane.

13. Device according to claim 9 wherein said conveyor device is formed by a pulling clamp that is arranged outside said tubular component.

14. Device according to claim 9 wherein said conveyor device is formed by a pusher rod that is arranged inside said tubular component.

15. Device according to claim 9 wherein said shaping unit is formed by two complementary bodies that engage the opposite sides of said tubular component.

16. Device according to claim 9 wherein an extrusion head is arranged horizontally, so as to perform a horizontal extrusion.

17. Device according to claim 9 wherein said half-mold is arranged below an extrusion region.

18. Device according to claim 9 in which a movement direction of said shaping unit is substantially perpendicular to a conveyance direction of said conveyor device.

19. Method for producing a blow-molded tubular body having multiple dimensions, which comprises the following stages:

a) completely extruding a tubular component that is closed on a front side onto a conveyor device, with injection of gas inside said tubular component, b) moving said conveyor device so that the tubular component is positioned between two complementary shaping bodies, c) subsequently, after said extrusion onto said conveyor device has been completed, moving said two complementary shaping bodies into engagement with opposite sides of said tubular component, d) pressing said tubular component on said opposite sides with said shaping bodies to impart an asymmetrical shape to said tubular component, e) depositing the shaped tubular component, in a plastic state, on a half-mold, and f) closing said half-mold with the complementary half-mold and blow-molding.

20. Device for preparing a preform for use in a blow molding process, comprising:

a shaping unit substantially altering the shape of a tubular component before deposition of said tubular component on a half-mold;

a nozzle for the injection of gas inside said tubular component during an extrusion;

a conveyor device for conveying said tubular component during said extrusion and allowing an engagement of said shaping unit with said tubular component;

said shaping unit comprising two parts arranged on opposite sides of said tubular component and extending longitudinally along a substantial portion of said tubular component, said two parts being relatively movable with respect to one another for substantially altering the shape of said tubular component;

said conveyor device being distinct and provided with independent movement with respect to said shaping unit.

* * * * *